United States Patent
Xue et al.

(10) Patent No.: US 9,597,865 B2
(45) Date of Patent: Mar. 21, 2017

(54) TURNOVER DEVICE FOR WHEEL PRINTING

(71) Applicant: CITIC Dicastal CO., LTD, Qinhuangdao (CN)

(72) Inventors: Bowen Xue, Qinhuangdao (CN); Jiandong Guo, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 0 days.

(21) Appl. No.: 15/135,952

(22) Filed: Apr. 22, 2016

(65) Prior Publication Data

US 2016/0311216 A1   Oct. 27, 2016

(30) Foreign Application Priority Data

Apr. 24, 2015   (CN) .......................... 2015 1 0199220

(51) Int. Cl.
*B65G 47/248* (2006.01)
*B41F 17/28* (2006.01)
*B41F 17/00* (2006.01)

(52) U.S. Cl.
CPC ............ *B41F 17/28* (2013.01); *B41F 17/001* (2013.01); *B41P 2200/31* (2013.01); *B60B 2310/656* (2013.01); *B60B 2310/658* (2013.01); *B60B 2900/572* (2013.01)

(58) Field of Classification Search
CPC .................. B41F 17/26; B41F 17/006; B60B 2310/656–2310/658; B60B 2340/30–2340/32
See application file for complete search history.

(56) References Cited

U.S. PATENT DOCUMENTS 2,078,366 A * 4/1937 Bound .................. B41F 17/006
101/126

* cited by examiner

*Primary Examiner* — Joshua D Zimmerman
(74) *Attorney, Agent, or Firm* — Maier & Maier, PLLC

(57) ABSTRACT

A turnover device for wheel printing, which is composed of a stand, a servo motor, driving mechanisms, a turnover shaft, a tensioning air cylinder and the like. When in use, the turnover device provided by can meet the requirements for positioning a wheel fixed window and turning over the wheel, and meanwhile has the characteristics of simple structure, advanced technology, high automation degree, safe and stable performance.

1 Claim, 2 Drawing Sheets

TURNOVER DEVICE FOR WHEEL PRINTING

TECHNICAL FIELD

The present invention relates to a turnover device, and in particular to an on-line turnover device for wheel printing.

BACKGROUND ART

With the diversification of wheel products, customers constantly propose various special requirements on the wheel, and one is to print a LOGO pattern on the front face of a buffed wheel. A traditional printing method is that a worker places the wheels on the fixing fixture one by one and then favorably adjusts the angle for printing. A burning issue is how to realize the on-line turnover printing for a wheel rapidly, conveniently and efficiently.

SUMMARY OF THE INVENTION

An object of the present invention is to provide a turnover device for wheel printing, which can meet the requirements for positioning a fixed window of a wheel on line and turning over the wheel.

In order to achieve the object described above, a technical solution of the present invention is as follows: a turnover device for wheel printing is composed of a stand, an elevating air cylinder, a guide post, a guide sleeve, a lifting board, a turnover air cylinder, a turnover shaft, a support plate, a synchronizing mechanism, a guide rail, a left slide table, a left driving mechanism, a right driving mechanism, a right slide table, a clamping air cylinder, a servo motor, an expanding core, an expanding sleeve, a flange, a cylinder rod and a piston. Both the elevating air cylinder and the guide post are fixed on a base plate of the stand; an output rod of the elevating air cylinder is hinged with the lifting board fixed with the guide sleeve; the lower ends of both the turnover air cylinder and the turnover shaft are hinged with the lifting board; and the upper end of the turnover air cylinder is hinged with the turnover shaft; the synchronizing mechanism is fixed above the support plate, and is respectively connected with the left slide table and the right slide table, the left driving mechanism and the right driving mechanism are respectively fixed above the left slide table and the right slide table and are fixed above the support plate through the guide rail; the servo motor is fixed below the right slide table, and an output end of the servo motor is connected with the fight driving mechanism; and the clamping air cylinder is fixed on a side face of the stand, and an output end of the clamping air cylinder is connected with the right slide table.

The cylinder rod is connected with the piton and is matched with a hole above the turnover shaft to form a tensioning air cylinder together with the flange fixed at the top of the turnover shaft; and the cylinder rod is connected with the expanding core and is matched with the expanding sleeve fixed above the flange.

During actual use, a sensor is used to position a wheel on a roller way, and the clamping air cylinder, under the action of the synchronizing mechanism, drives the left driving mechanism and the right driving mechanism to clamp the wheel; the wheel is made to rotate by the servo motor to position a window to be printed; the turnover shaft is elevated by the elevating air cylinder; the axial and radial positioning for the wheel is realized by an expanding sleeve and a flange; after that, the left and right clamping mechanisms are released; the turnover air cylinder drives the wheel to rotate by a certain degree, and at the moment, a printing head of a pad printer mounted beside the roller way moves downwards to print a fixed pattern onto the front face of the wheel.

When in use, the turnover device provided by the present invention can meet the requirements for positioning a fixed window of a wheel and turning over the wheel, and meanwhile, has the characteristics of simple structure, advanced technology, high automation degree, safe and stable performance.

Figure 1:
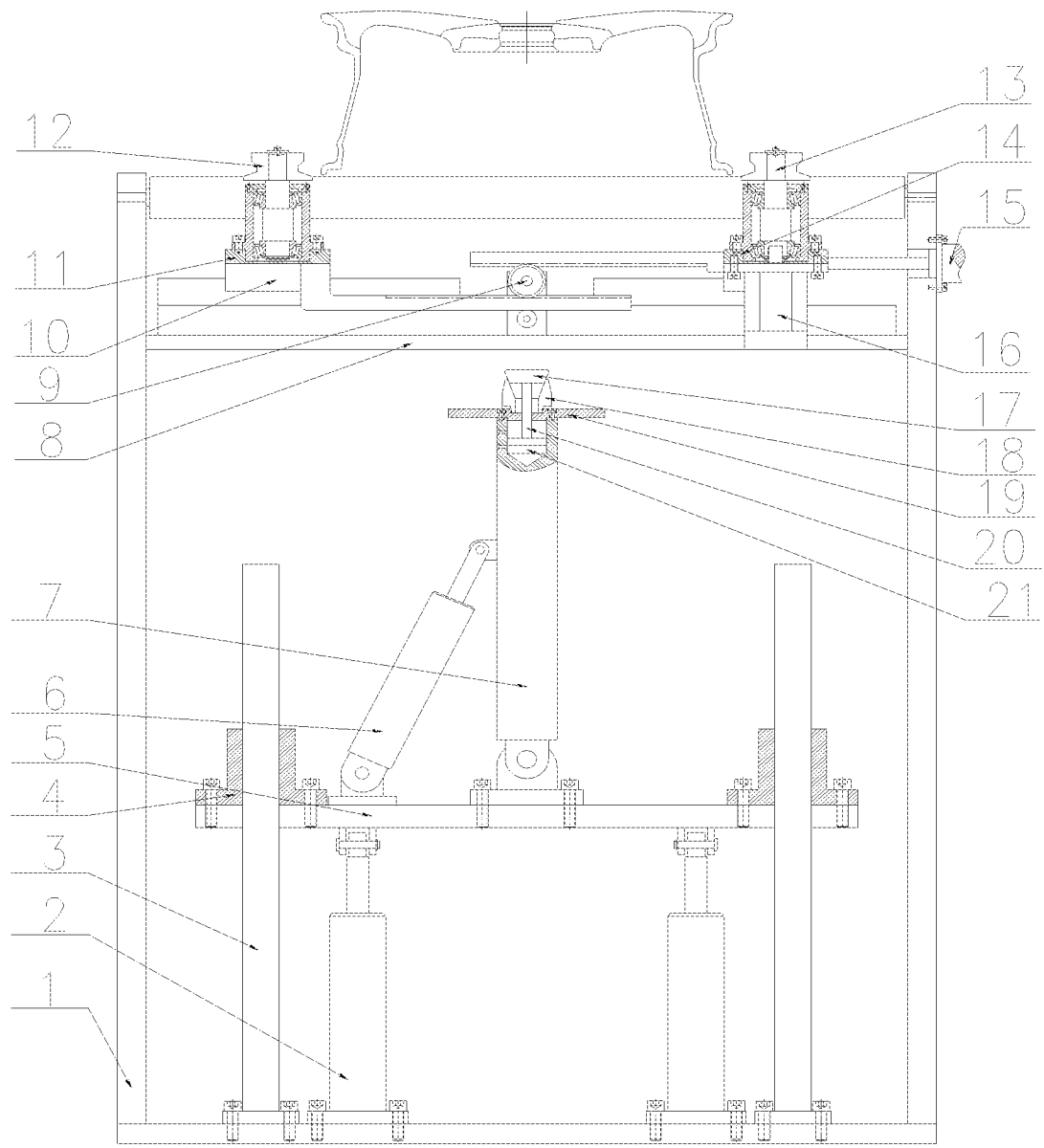
FIG. 1 is a front view of a turnover device for wheel printing.
Figure 2:
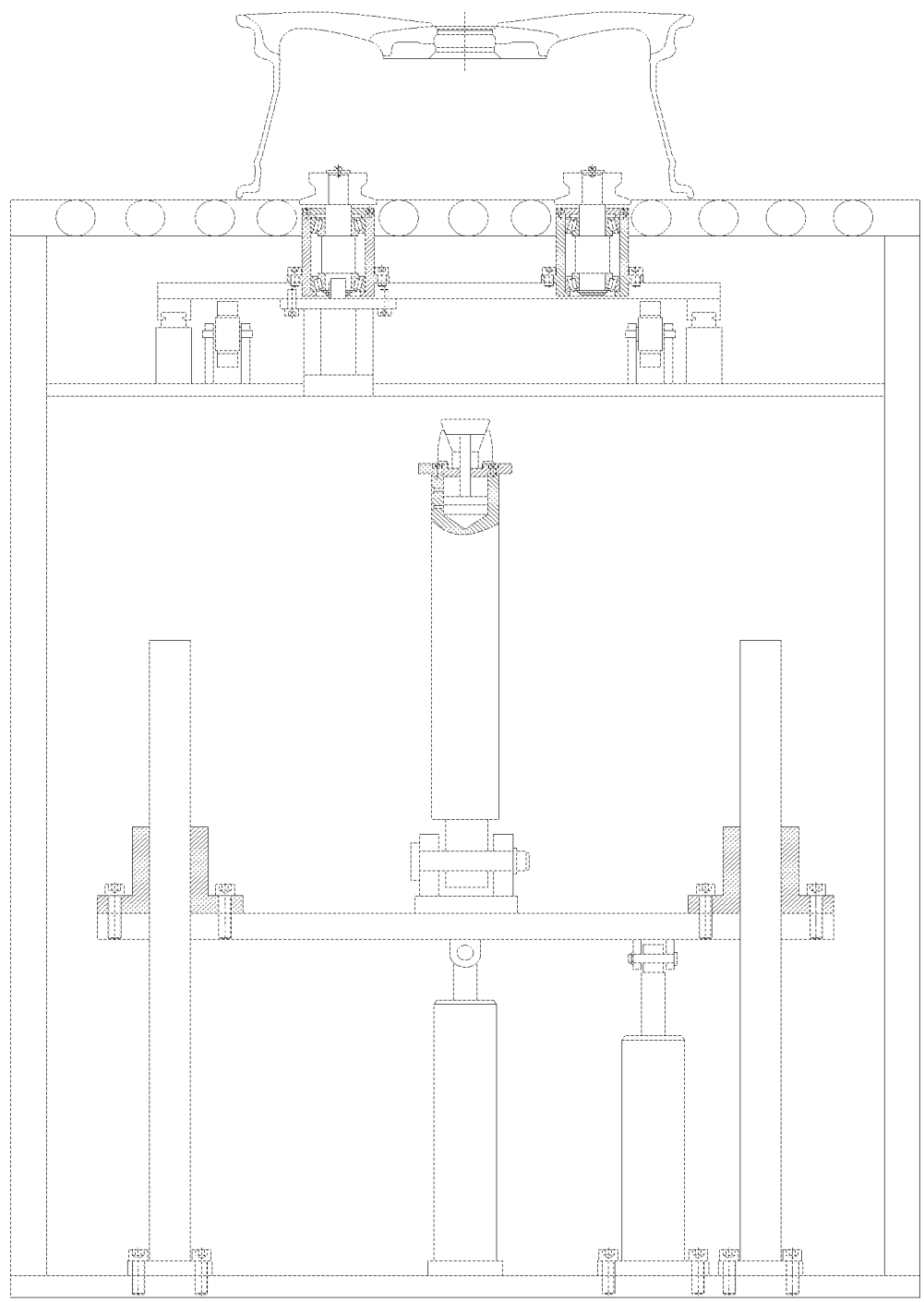
FIG. 2 is a left view of a turnover device for wheel printing.

In the figures, numeric symbols are as follows: 1—stand, 2—elevating air cylinder, 3—guide post, 4—guide sleeve, 5—lifting board, 6—turnover air cylinder, 7—turnover shaft, 8—support plate, 9—synchronizing mechanism, 10—guide rail, 11—left slide table, 12—left driving mechanism, 13—right driving mechanism, 14—right slide table, 15—clamping air cylinder, 16—servo motor, 17—expanding core, 18—expanding sleeve, 19—flange, 20—cylinder rod and 21—piston.

DETAILED DESCRIPTION OF THE INVENTION

In the following, the details and working conditions of a specific device provided by the present invention are described in combination with the figures.

The turnover device is composed of a stand 1, an elevating air cylinder 2, a guide post 3, a guide sleeve 4, a lifting board 5, a turnover air cylinder 6, a turnover shaft 7, a support plate 8, a synchronizing mechanism 9, a guide rail 10, a left slide table 11, a left driving mechanism 12, a right driving mechanism 13, a right slide table 14, a clamping air cylinder 15, a servo motor 16, an expanding core 17, an expanding sleeve 18, a flange 19, a cylinder rod 20 and a piston 21. Both the elevating air cylinder 2 and the guide post 3 are fixed on a base plate of the stand 1; an output rod of the elevating air cylinder 2 is hinged with the lifting board 5 fixed with the guide sleeve 4; the lower ends of both the turnover air cylinder 6 and the turnover shaft 7 are hinged with the lifting board 5, and the upper end of the turnover air cylinder 6 is hinged with the turnover shaft 7; the synchronizing mechanism 9 is fixed above the support plate 8, and is respectively connected with the left slide table 11 and the right slide table 14; the left driving mechanism 12 and the tight driving mechanism 13 are respectively fixed above the left slide table 11 and the right slide table 14 and are fixed above the support plate 8 through the guide rail 10; the servo motor 16 is fixed below the right slide table 14, and an output end of the servo motor is connected with the right driving mechanism 13; and the clamping air cylinder 15 is fixed on a side face of the stand 1, and an output end of the clamping air cylinder 15 is connected with the right slide table 14.

The cylinder rod 20 is connected with the piton 21 and is matched with a hole above the turnover shaft 7 to form a tensioning air cylinder together with the flange 19 fixed at the top of the turnover shaft 7; and the cylinder rod 20 is connected with the expanding core 17 and is matched with the expanding sleeve 18 fixed above the flange 19.

In a working process, a sensor is used to position a wheel on a roller way, and the clamping air cylinder 15, under the action of the synchronizing mechanism 9, drives the left driving mechanism 12 and the right driving mechanism 13 to clamp the wheel; the wheel is made to rotate by the servo motor 16 to position a window to be printed; the turnover shaft 7 is elevated by the elevating air cylinder 2; the axial and radial positioning for the wheel is realized by the expanding sleeve 18 and the flange 19; after that, the left and right clamping mechanisms are released; the turnover air cylinder 6 drives the wheel to rotate by a certain degree, and at the moment, a printing head of a pad printer mounted beside the roller way moves downwards to print a fixed pattern onto the front face of the wheel.

What is claimed is:

1. A turnover device for wheel printing, which comprises:
    a stand, an elevating air cylinder, a guide post, a guide sleeve, a lifting board, a turnover air cylinder, a turnover shaft, a support plate, a synchronizing mechanism, a guide rail, a left slide table, a left driving mechanism, a right driving mechanism, a right slide table, a clamping air cylinder, a servo motor, an expanding core, an expanding sleeve, a flange, a cylinder rod and a piston; wherein
    both the elevating air cylinder and the guide post are fixed on a base plate of the stand;
    an output rod of the elevating air cylinder is hinged with the lifting board fixed with the guide sleeve;
    the lower ends of both the turnover air cylinder and the turnover shaft are hinged with the lifting board;
    the upper end of the turnover air cylinder is hinged with the turnover shaft;
    the synchronizing mechanism is fixed above the support plate, and is respectively connected with the left slide table and the right slide table;
    the left driving mechanism and the right driving mechanism are respectively fixed above the left slide table and the right slide table and are fixed above the support plate through the guide rail;
    the servo motor is fixed below the right slide table, and an output end of the servo motor is connected with the right driving mechanism;
    the clamping air cylinder is fixed on a side face of the stand, and an output end of the clamping air cylinder is connected with the right slide table;
    the cylinder rod is connected with the piston and is matched with a hole in the turnover shaft to form a tensioning air cylinder together with the flange fixed at the top of the turnover shaft; and
    the cylinder rod is connected with the expanding core and is matched with the expanding sleeve fixed above the flange.

* * * * *